US008207291B2

(12) United States Patent
Galewski

(10) Patent No.: US 8,207,291 B2
(45) Date of Patent: Jun. 26, 2012

(54) PROCESS FOR DEVOLATILIZATION OF POLYMER OF AN AROMATIC ALKYLENE

(75) Inventor: Jean-Marc Galewski, Noeux-les-Mines (FR)

(73) Assignee: Ineos Europe Limited, Hampshire (GB)

( * ) Notice: Subject to any disclaimer, the term of this patent is extended or adjusted under 35 U.S.C. 154(b) by 246 days.

(21) Appl. No.: 12/451,908

(22) PCT Filed: Jun. 3, 2008

(86) PCT No.: PCT/EP2008/056815
§ 371 (c)(1),
(2), (4) Date: Jan. 20, 2010

(87) PCT Pub. No.: WO2008/151965
PCT Pub. Date: Dec. 18, 2008

(65) Prior Publication Data
US 2010/0130719 A1    May 27, 2010

(30) Foreign Application Priority Data

Jun. 12, 2007   (EP) .................................... 07252376

(51) Int. Cl.
*C08C 2/06*   (2006.01)
(52) U.S. Cl. .......... 528/500; 528/480; 528/499; 521/40; 521/47; 526/72; 526/77; 526/88; 526/346; 203/9; 203/39; 203/42; 203/43; 203/47; 203/71; 203/95; 203/98

(58) Field of Classification Search .................. 528/480, 528/481, 483, 499, 500, 501, 502 R, 502 C, 528/502 E, 503; 521/40, 40.5, 47; 422/131, 422/142, 144, 168; 210/600, 633, 188; 203/9, 203/12, 39, 40, 42, 43, 44, 45, 46, 47, 71, 203/95, 98; 526/72, 77, 78, 335, 340, 346, 526/347
See application file for complete search history.

(56) References Cited

U.S. PATENT DOCUMENTS
2004/0220382 A1   11/2004   Galewski

OTHER PUBLICATIONS

PCT International Preliminary Report on Patentability dated Dec. 30, 2009; International Application No. PCT/EP2008/056815; filed Jun. 3, 2008 (8 pgs).

*Primary Examiner* — James J Seidleck
*Assistant Examiner* — Frances Tischler
(74) *Attorney, Agent, or Firm* — Nixon & Vanderhye

(57) ABSTRACT

Process for devolatilization of a polymer of an aromatic alkylene, such as styrene and, in particular, an improved process using water as a stripping agent (i) in which the total amount of water to be disposed of can be reduced, (ii) which allows at least a portion of the water to be recycled as stripping agent, reducing make-up requirements for the stripping agent, and (iii) which allows at least a portion of the aromatic alkylene monomer in the water to be recycled to the polymerization process (via the devolatilization steps) rather than being disposed.

7 Claims, 1 Drawing Sheet

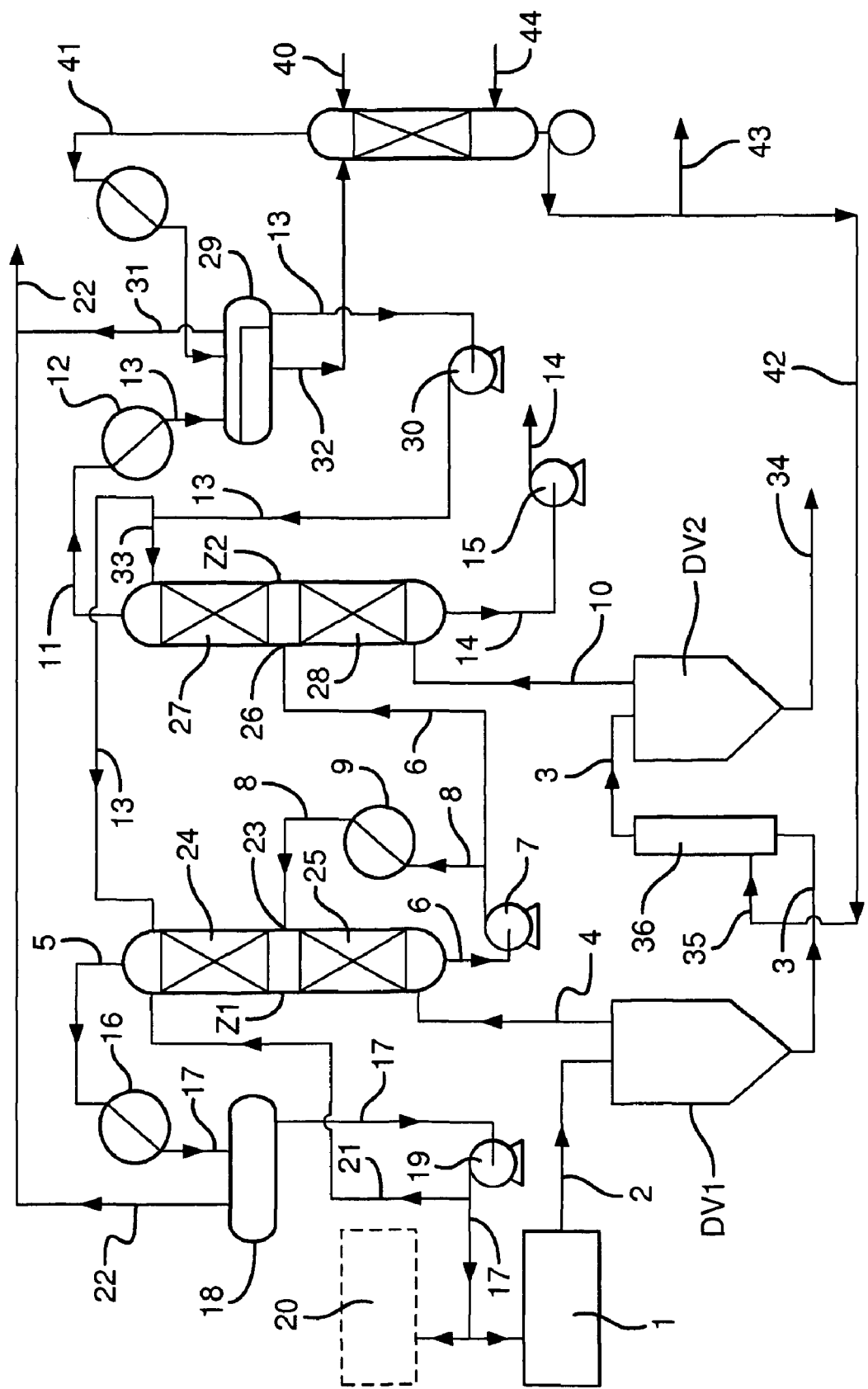

PROCESS FOR DEVOLATILIZATION OF POLYMER OF AN AROMATIC ALKYLENE

This application is the U.S. national phase of International Application No. PCT/EP2008/056815, filed 3 Jun. 2008 which designated the U.S. and claims priority to European Application No. 07252376.4, filed 12 Jun. 2007, the entire contents of each of which are hereby incorporated by reference.

The present invention relates to a process for devolatilization of a polymer of an aromatic alkylene, such as styrene.

It is known practice to continuously manufacture aromatic alkylene polymers by a process of bulk polymerization, in particular a homopolystyrene or a copolymer of styrene having a high impact strength ("HIPS") and which is especially modified by grafting onto a rubber. In such a process, the polymer is first continuously prepared by a bulk polymerization in the liquid monomer. This thus gives a mass of polymer melt, dispersed in the liquid monomer, which is then subjected to degassing, generally known by the term devolatilization. The aim of the devolatilization is to remove from the polymer the unreacted monomer and volatile compounds, such as oligomers formed especially during the polymerization and possibly hydrocarbon-based impurities accompanying the monomer, which are generally inert and have a low boiling point, such as, for example, ethylbenzene (EB), cumene, n-propylbenzene (NPB), methylcyclohexane (MCH) and ethyltoluene (ET).

It is known practice to perform the devolatilization in one or, preferably, at least two successive steps, under a pressure which is generally less than atmospheric pressure, as is described in U.S. Pat. Nos. 3,853,672, 3,886,049, 3,903,202 and 3,928,300 and in EP 0 323 428. The devolatilization gives one or more streams of gas, separated from the polymer, generally comprising the unreacted monomer and volatile compounds which may be recovered, for example, by condensation. The amount of monomer thus recovered is generally so large that it is necessary for economic reasons to recycle the monomer, for example into the polymerization.

US 2004/0220382 describes a process and a device for the continuous manufacture of a polymer of an aromatic alkylene such as styrene, especially comprising a step of recovering the unreacted monomer.

In the process of US 2004/0220382, the product of the bulk polymerization of an aromatic alkylene, in the form a mass of polymer melt is subjected to a devolatilization in at least two successive steps so as to separate the polymer from the unreacted monomer and the oligomers formed at least partially during the polymerization. In an embodiment of US 2004/0220382, a stripping agent is added to the polymer melt between the two devolatilization steps. A particularly preferred stripping agent is water, which is subsequently separated and recovered via a reflux vessel.

Typically, this recovered water still comprises significant quantities of aromatic alkylene monomer, and must be disposed of as contaminated waste, at significant cost and with loss of the monomer therein. An improved process has now been found (i) in which the total amount of water to be disposed of can be reduced, (ii) which allows at least a portion of the water to be recycled as stripping agent, reducing make-up requirements for the stripping agent, and (iii) which allows at least a portion of the aromatic alkylene monomer in the water to be recycled to the polymerisation process (via the devolatilization steps) rather than disposed of.

Thus, the present invention provides a process for devolatilization of an aromatic alkylene polymer, which comprises:

a) providing the aromatic alkylene polymer product in the form a mass of polymer melt also comprising aromatic alkylene monomer and oligomers,
b) subjecting the mass of polymer melt to a first devolatilization step to produce a gaseous first stream comprising aromatic alkylene monomer and oligomers, and a second stream comprising the remainder of the mass of polymer melt,
c) adding water as a stripping agent to the second stream to produce a third stream comprising the remainder of the mass of polymer melt and the water,
d) subjecting the third stream to a second devolatilization step to produce a gaseous fourth stream comprising the water, aromatic alkylene monomer and oligomers, and a fifth stream comprising the devolatilized mass of polymer melt,
e) subjecting the gaseous fourth stream to a separations step to produce a sixth stream comprising the water and aromatic alkylene monomer and a seventh stream comprising the oligomers,
f) subjecting the sixth stream to a separations step to separate an eighth stream comprising the water and a reduced quantities of aromatic alkylene monomer from a ninth stream comprising the remainder of the aromatic alkylene monomer,
g) subjecting the eighth stream to azeotropic stripping in a stripping column under vaccum using steam to produce an overheads stream comprising steam and the majority of the aromatic alkylene monomer which is passed with the sixth stream to the separations step (f), and a bottoms stream comprising water with a reduced quantity of aromatic alkylene monomer, at least a portion of which is recycled as the stripping agent in step (c).

In a specific embodiment, the present invention relates to an improvement of the process of US 2004/0220382. In particular, steps (a) to (f) are preferably as described in US 2004/0220382, in particular in relation to FIG. 1 of US 2004/0220382.

Thus, step (a) of the process of the present invention, preferably comprises bulk polymerising an aromatic alkylene monomer to produce a mass of polymer melt comprising aromatic alkylene monomer and oligomers (in which case the present invention may also be considered a process for the continuous manufacture of an aromatic alkylene polymer).

The expression "aromatic alkylene polymer" as used herein generally means aromatic alkylene homopolymers and copolymers containing at least 50% by weight of aromatic alkylene. The term "aromatic alkylene" generally means vinyl aromatic monomers, in particular styrene monomers, for example styrene or alpha-methylstyrene. The copolymers may be copolymers of an aromatic alkylene with a nitrile, in particular acrylonitrile, such as a copolymer of styrene with acrylonitrile (SAN) or a copolymer of acrylonitrile-butadiene-styrene (ABS), or a copolymer of styrene with an acrylic or methacrylic acid ester, or alternatively a styrene copolymer having a high impact strength ("HIPS") in particular modified by grafting onto a natural or synthetic rubber, such as a polymer of a diene, especially of a 1,3-conjugated diene, for example a polybutadiene or a polyisoprene.

The aromatic alkylene polymer is prepared continuously by a bulk polymerization, generally a free-radical polymerization, initiated either thermally or with the aid of at least one free-radical-generating polymerization initiator, especially a peroxide, a hydroperoxide or an organic perester, for example one of the initiators mentioned in Kunststoffe 80 (1990), 7, pages 830 to 837. The bulk polymerization is generally performed in the presence of the liquid monomer, and optionally in the presence of one or more hydrocarbon-based impurities accompanying the monomer, which are generally inert and with a low boiling point, such as, for example, EB, cumene, NPB, MCH and ET. The hydrocarbon-based impurity or impurities accompanying the monomer may be present in the bulk polymerization medium in an amount ranging from 0.1% to 40% and preferably from 0.5% to 30% by weight relative to the total amount of monomer used. The bulk polymerization is generally performed at a temperature ranging from 100° C. to 200° C. and preferably from 110° C. to 190° C., and at an absolute pressure ranging from 0.1 to 10 MPa and preferably from 0.1 to 6 MPa. It may be performed in one or, preferably, several reactors in series.

The mass of polymer melt resulting from the bulk polymerization generally consists of a mixture essentially comprising the aromatic alkylene polymer formed, unreacted monomer, oligomers, optionally one or more hydrocarbon-based impurities accompanying the monomer, which are generally inert and with a low boiling point, such as, for example, EB, cumene, NPB, MCH and ET, and optionally one or more additives used during or after the polymerization, in particular lubricants such as mineral oils. The mixture which is thus subjected to the devolatilization may comprise, per 100 parts by weight of polymer, from 5 to 40 and preferably from 10 to 30 parts by weight of unreacted monomer, from 0.1 to 5 and preferably from 0.5 to 3 parts by weight of oligomers and optionally from 0.1 to 40 and preferably from 0.5 to 30 parts by weight of one or more hydrocarbon-based impurities accompanying the monomer.

Any suitable first devolatilization step may be used in step (b) of the present invention. The first devolatilization step may be designated as DV1. Preferably, the gaseous first stream comprising aromatic alkylene monomer and oligomers removed therefrom is passed to a separations step in which at least some of the aromatic alkylene monomer is recovered and recycled, preferably in the form of a liquid stream, directly or indirectly into a reaction for the polymerization of the aromatic alkylene, and/or to convey it, preferably in the form of a liquid stream, directly or indirectly into an aromatic alkylene manufacturing unit. Preferably, the separation step is a first zone for direct condensation or fractionation (Z1), from which a gas stream comprising essentially the monomer is removed from the top, while a liquid stream (L1) rich in oligomers is removed from the bottom. Suitably, a portion of the liquid stream (L1) removed from Z1 is cooled and then returned into Z1 so as to partially condense by direct contact the gaseous first stream in Z1. Moreover, at least one portion of the gas stream recovered from the top of Z1 may be advantageously recovered and returned, after condensation and optionally cooling (or even supercooling), in the form of a liquid stream into Z1, preferably into the top part (or top half) of Z1, and especially into the top of Z1, so as to intensify in particular the liquid/gas direct contact in Z1 and thus to improve the extraction of the heaviest compounds, especially the oligomers, in the gas stream resulting from the first step of the devolatilization. Under these conditions, the top part (or top half) of Z1 may advantageously function according to an improved method for extracting the oligomers.

Before its return into Z1, the portion taken from the liquid stream L1 removed from the bottom of Z1 may be advantageously cooled to a temperature such that the resulting mixture in Z1 at the point of return of L1 is at a temperature close to its dew point. Thus, the portion of Z1 which is in the region of and especially below the point of return of the portion taken from L1 may function according to a "saturation" mode. The cooling of the portion taken from L1 has the advantage of reducing or even avoiding any unwanted polymerization and/or oligomerization in Z1. The portion taken from L1 may also be cooled with the purpose especially of monitoring and controlling the level of liquid in Z1 and in particular in the bottom of Z1. Under these conditions, the part of Z1 which is below the point of return of the portion taken from L1 may function according to an improved mode of direct condensation (and/or especially of saturation) by liquid/gas contact. The point of return of the portion taken from L1 may be in the central part of Z1. It may in particular be at a point of Z1 such that it delimits in Z1 two distinct parts by their function:

a top part (or top half) for "fractionation" or "extraction" of the heaviest compounds, especially the oligomers, which especially ends at the top by the removal of the gas stream comprising essentially the monomer, and a bottom part (or bottom half) for "direct condensation" (and/or especially for saturation) in which, especially, the gaseous first stream resulting from the first step of the devolatilization is partially condensed (and/or especially saturated) by liquid/gas direct contact, by virtue in particular of the return of the portion taken from the cooled L1, and which is especially at the bottom by the removal of the liquid stream L1 rich in oligomers.

The top part of Z1 (known as the "fractionation" or "extraction" part) may correspond to a height, ranging from the point of return of the portion taken from L1 up to the top of Z1, equivalent to a number of theoretical plates ranging from 1 to 15 and preferably from 1 to 6. The zone Z1 may contain an internal packing capable of offering a low pressure drop and being able especially to be chosen such that it is possible to maintain in Z1 an absolute pressure (especially a sub-atmospheric pressure) which is closest to that existing in DV1. A "structured" internal packing may be used.

It is preferable to introduce the gaseous first stream resulting from the first step of the devolatilization into the part of Z1 which is below the point of return of the portion taken from L1 into Z1, preferably in the bottom part (or bottom half) of Z1, and especially at the bottom of Z1. The zone Z1 may advantageously function in the absence of any conventional heating means, especially placed at the bottom of Z1, for example in the absence of a boiling vessel. Such an absence also has the advantage of reducing or avoiding any unwanted polymerization and/or oligomerization in Z1.

In step (c) of the process of the present invention water is added as a stripping agent to the second stream to produce a third stream comprising the remainder of the mass of polymer melt and the water. Suitably, the water is added in an amount ranging from 0.5% to 5% and especially from 1% to 3% by weight relative to the polymer. The mixture of the polymer melt with the stripping agent is preferably produced in a static mixer before being passed as the third stream to the second devolatilization in step (d) of the present invention. It is particularly advantageous to use superheated water, for example at a temperature of 180 to 240° C., since the superheated water can then simultaneously act as stripping agent to facilitate the devolatilization and as a heat supply in the subsequent second devolatilization in step (d), thus improving the thermal balance of this step.

Any suitable second devolatilization step may be used in step (d) of the present invention. The second devolatilization step may be designated as DV2.

The separations step of step (e) of the present invention is preferably a second zone for direct condensation or fractionation. The sixth stream is usually recovered from the separations step of step (e) as a gaseous stream, but is preferably cooled and liquefied prior to use in step (f). Step (e) is preferably as described in US 2004/0220382.

Preferably, the gaseous fourth stream resulting from step (d) is conveyed into a second zone Z2 having the two-fold function of direct condensation and fractionation. Z2 may also be fed with a portion of the liquid stream L1 derived from the bottom of Z1, which is rich in oligomers. In particular, the portion of the liquid stream L1 may feed Z2 at a point in Z2 which is preferably above the point in which the gaseous fourth stream resulting from the second step of the devolatilization feeds Z2, and in particular in a point which is in the central part of Z2. Moreover, the gaseous fourth stream resulting from the second step of the devolatilization preferably feeds into the bottom part (or the bottom half) of Z2, and especially into the bottom of Z2.

The point into which Z2 is fed with the other portion of the liquid stream L1 may be in a point of Z2 such that it delimits in Z2 two separate parts by their function:

a top part (or top half) for "fractionation" or "extraction" of the heaviest compounds, especially the oligomers, and which especially ends at the top by removal of the gaseous sixth stream comprising the water and monomer, and a bottom part (or bottom half) for "direct condensation" (and/or especially for "saturation") in which especially the gaseous fourth stream resulting from the second step of the devolatilization is partially condensed (and/or especially saturated) by liquid/gas direct contact, in particular by means of sending the other portion of L1 into Z2, and which especially ends at the bottom by removing the seventh stream comprising essentially the oligomers.

The top part of Z2 (for "fractionation" or "extraction") may correspond to a height, ranging from the point in which Z2 is fed with L1 up to the top of Z2, equivalent to a number of theoretical plates ranging from 1 to 15 and preferably from 1 to 6. The bottom part of Z2 can also function according to a "saturation" mode, especially by means of sending the other portion of the liquid stream L1 into Z2.

The zone Z2 may contain an internal packing similar to that used in Z1.

The above configuration makes it possible to collect and concentrate in a single point of the process, in particular in the bottom of Z2, all of the oligomers recovered from the two steps of the devolatilization. It is thus particularly advantageous thus to remove from the bottom of Z2 a seventh stream comprising essentially the oligomers freed of the monomer and having, for example, an extremely low monomer content, preferably of less than 10%, especially less than 5%, in particular less than 1% or even less than 0.5% by weight. The seventh stream is generally discharged from the process and may be, for example, readily recovered and even upgraded in other processes or applications, especially either as energetic material in an incinerator, a boiler or a power station, or as starting material in a thermal or catalytic cracking unit capable of manufacturing alkanes or olefins.

Any suitable separations step may be used for step (f). Preferably, the separations step of step (f) of the present invention is a fractionating step, most preferably as described in US 2004/0220382, which fractionates by phase separation and/or by decantation an organic liquid phase comprising the aromatic alkylene monomer (ninth stream) from a liquid phase which comprises the water (eighth stream), and which is immiscible with the organic liquid phase (ninth stream).

This eighth stream has reduced quantities of the aromatic alkylene monomer, and in step (g) is subjected to azeotropic stripping in a stripping column under vaccum using steam. Preferably the stripping comprises direct stream injection into the stripping column. Especially where the aromatic alkylene monomer is styrene, a very low reboiling ratio, typically 1-3%, is preferred due to the similarity in volatility of the water and styrene.

The overheads stream from the stripping column comprises steam and the majority of the aromatic alkylene monomer, and is recycled to the separations step (f). From this step the aromatic alkylene monomer may be separated and recycled, preferably by passing to at least one of the first and second zones for direct condensation or fractionation, and subsequently for re-use as monomer.

The bottoms stream from the stripping column comprises water and a reduced quantity of aromatic alkylene monomer. At least a portion of this is recycled as the stripping agent in step (c). A portion may also be disposed of to maintain total aqueous volume in the system, but this is a much lower quantity than without treatment according to the present invention, and the water comprises significantly reduced aromatic alkylene monomers (and other volatile compounds) compared to the untreated stream.

According to the present invention, devolatilization is performed in at least two successive steps. The mass of polymer melt is subjected to a devolatilization performed at a temperature ranging from 200 to 280° C. and preferably from 220 to 260° C., and under a pressure below atmospheric pressure, in particular an absolute pressure ranging from 0.1 to 20 kPa and preferably from 0.1 to 15 kPa.

The devolatilization may comprise a step of preheating the mass of polymer melt to reach the desired devolatilization temperature, this preheating especially being performed before the first step of the devolatilization. Another preheating may optionally be performed between the two successive steps of the devolatilization, so as to bring the mass of polymer melt resulting from the first step to the desired temperature for the second step. The preheating(s) may be performed using preheaters equipped with static blending means.

The two successive steps of devolatilization are especially performed under equivalent or successively higher vacuums. Thus, the first step may be performed at an absolute pressure ranging from 0.1 to 20 kPa, preferably from 0.5 to 15 kPa and especially from 1 to 10 kPa, whereas the second step is performed at an absolute pressure generally identical to or lower than that in the first step, for example at an absolute pressure ranging from 0.1 to 10 kPa, preferably from 0.1 to 7 kPa and especially from 0.1 to 4 kPa. The devolatilization may be performed in depressurization chambers under vacuum, in particular in which the mass of polymer melt falls by gravity in the form of threads or droplets. It is possible, for example, to carry out a devolatilization such as that described in U.S. Pat. Nos. 3,853,672, 3,886,049 and 3,928,300. The residual monomer content of the mass of polymer melt may be such that after the first step of the devolatilization, the mass of polymer contains, per 100 parts by weight of polymer, from 0.1 to 1 part by weight of monomer, and such that after the second step, it contains less than 0.1, preferably less than 0.05 and especially less than 0.01 part by weight of monomer.

The gaseous first stream resultant from the first step of the devolatilization is conveyed into Z1 which preferably operates under a pressure identical to or substantially identical to that prevailing in the first step of the devolatilization, and at a temperature which may range at the bottom of Z1 from 20 to 90° C. and preferably from 40 to 90° C., and at the top of Z1 from 10 to 70° C. and preferably from 20 to 60° C. The portion taken from the liquid stream L1 for recycle to Z1 may be cooled to a temperature ranging, for example, from 20 to 80° C. and preferably from 40 to 80° C., so as to control and regulate especially the level of liquid in Z1. The gas stream leaves at the top of Z1, and may then be advantageously recovered, for example by condensation and optionally by cooling or even supercooling, especially in the form of a liquid stream. The stream thus recovered is generally a mixture essentially comprising the monomer and in particular may comprise, per 100 parts by weight of monomer, from 0.001 to 1, preferably from 0.005 to 0.1 and especially from 0.005 to 0.05 part by weight of oligomers, and optionally from 1 to 70 and preferably from 5 to 60 parts by weight of one or more hydrocarbon-based impurities accompanying the monomer.

The gaseous fourth stream resulting from the second step of the devolatilization is conveyed into Z2 which preferably operates under a pressure identical to or substantially identical to that prevailing in the second step of the devolatilization, and at a temperature which may range at the bottom of Z2 from 50 to 140° C. and preferably from 60 to 130° C., and at the top of Z2 from 5 to 60° C. and preferably from 10 to 50° C. The liquid stream L3 leaves the bottom of Z2 in the form of a mixture essentially comprising the oligomers and in particular comprising, per 100 parts by weight of oligomers, from 0.01 to 10, preferably from 0.02 to 5, especially from 0.02 to 1 and in particular from 0.02 to 0.5 part by weight of monomer and possible from 0.005 to 5, preferably from 0.01 to 2, especially from 0.01 to 1 and in particular from 0.01 to 0.5 part by weight of one or more hydrocarbon-based impurities accompanying the monomer.

FIG. 1 diagrammatically shows a process for carrying out the present invention, especially for the continuous manufacture of an aromatic alkylene polymer. In particular, FIG. 1 shows a reaction zone (1) for the bulk polymerization of the aromatic alkylene monomer, linked via a line (2) to a polymer devolatilization zone successively comprising at least one first devolatilizer DV1 and one second devolatilizer DV2, so as to separate the polymer from the unreacted monomer and the oligomers formed at least partly during the polymerization.

According to the process of FIG. 1, the mass of polymer melt from the reaction zone (1) is passed via line (2) to a first devolatilizer (DV1) to produce a gaseous first stream comprising aromatic alkylene monomer and oligomers which is removed via line (4) and a second stream comprising the remainder of the mass of polymer melt, which is removed via line (3).

The gaseous first stream comprising aromatic alkylene monomer and oligomers is passed via line (4) to a first zone Z1 for direct condensation and fractionation. A top withdrawal line (5) removes from the top of Z1 a gas stream essentially comprising the monomer, and a bottom withdrawal line (6) removes from the bottom of Z1 a liquid stream rich in oligomers by means of a pump (7). A recycling line (8) takes a portion of the liquid stream from the bottom withdrawal line (6) to a cooling unit (9) and then back to the first zone Z1.

The second stream comprising the remainder of the mass of polymer melt, which is removed via line (3) is passed to a static mixer (36) where it is mixed with water as a stripping agent, passed from line (35). The mixed third stream is passed to a second volatilizer (DV2), to produce a gaseous fourth stream comprising the water, aromatic alkylene monomer and oligomers, which is removed via line (10) and a fifth stream comprising the devolatilized mass of polymer melt, which is removed via line (34). The mass of polymer melt thus freed of the volatile compounds may then be conveyed, for example, into an extruder or a pelletizer (not shown in FIG. 1), so as to form polymer granules or pellets which may then be cooled to room temperature. Before conveying the mass of polymer melt into an extruder or a pelletizer, a swelling agent (or expanding agent) such as a light alkane which may contain from 4 to 6 carbon atoms, for example n-pentane and/or isopentane, may also be added thereto so as to prepare a mass of expandable polymer which, after extrusion under specific conditions, may lead to the formation either of expandable granules (or beads) of polymer or of expanded articles (or finished objects), such as expanded sheets. Processes thus designed for the continuous manufacture of an expandable or expanded aromatic alkylene polymer are described in particular in Japanese patent application JP 09 221 562 and in European patent applications EP 0 126 459, EP 0 376 671 and EP 0 668 139.

The gaseous fourth stream comprising the water, aromatic alkylene monomer and oligomers is passed via line (10) to a second zone Z2 for direct condensation and fractionation. Also passed to the second zone Z2, via the bottom withdrawal line (6) is the remaining portion of the liquid stream from the bottom of Z1. A top withdrawal line (11) removes from the top of Z2 a gaseous sixth stream comprising the water and aromatic alkylene monomer, and a bottom withdrawal line (14) removes from the bottom of Z2 a liquid seventh stream essentially comprising the oligomers, by means, for example, of a pump (15).

According to the present invention, it is particularly advantageous to link the top withdrawal line (5) which removes the gas stream from the top of Z1 to a condenser (16) so as to form a liquid stream, which may be cooled or even supercooled, in a line (17) for recovering a liquid stream essentially comprising the monomer. The recovery line (17) may preferably be equipped with a reflux vessel (18) and a pump (19), and may also advantageously link the condenser (16) directly or indirectly to the reaction zone (1) for the bulk polymerization of the aromatic alkylene monomer and/or to a unit (20) for manufacturing the aromatic alkylene monomer. Moreover, some of the liquid stream circulating in the recovery line (17) may be advantageously taken from this line via a reflux line (21) linking the recovery line (17) to the first zone Z1, preferably to the top part (or the top half) of Z1, and especially at the top of Z1. The pressure, which is preferably sub-atmospheric pressure, prevailing in Z1 and in DV1 may be maintained and regulated by means of a vacuum line (22) linking the recovery line (17) or, preferably, the reflux vessel (18) to a vacuum unit (not shown in FIG. 1) arranged at the end of the vacuum line (22).

The recycling line (8), in which circulates a portion taken from the liquid stream L1 and cooled by the cooling unit (9), opens into the first zone Z1, preferably in the central part of Z1. The recycling line (8) can open into Z1 in a point (23) of Z1 such that it determines in Z1 the two separate parts by their function as described above, that is to say:

the top part (or the top half) (24) for "fractionation" or "extraction" of the heaviest compounds, especially the oligomers, and the bottom part (or the bottom half) (25) for "direct condensation" (and/or especially for "saturation").

The line (10) for removing the gaseous fourth stream from DV2 opens into the bottom part (or the bottom half) of Z2, especially into the bottom of Z2. Moreover, the bottom withdrawal line (6) of Z1 opens into Z2 in a point (26) of Z2 which is above the point at which the line (10) for removing the gaseous fourth stream from DV2 opens into Z2, preferably into the central part of Z2.

Moreover, the point (26) at which the withdrawal line (6) of Z1 opens into Z2 may be at a point on Z2 such that it determines in Z2 the two separate parts by their function as described above, that is to say:

the top part (or the top half) (27) for "fractionation" or "extraction" of the heaviest compounds, especially the oligomers, and the bottom part (or the bottom half) (28) for "direct condensation" (and/or especially for "saturation").

The top withdrawal line (11) removes from the top of Z2 a gaseous sixth stream comprising the water and the aromatic alkylene monomer. Line (11) preferably links the top of Z2 to a condenser (12) so as to liquefy the sixth stream prior to passing said stream to a reflux vessel (29) equipped with a pump (30). The pressure, especially the sub-atmospheric pressure, prevailing in Z2 and DV2 may be maintained and regulated by means of a vacuum line (31) linking the reflux vessel (29) to the vacuum unit (not shown in FIG. 1) arranged at the end of the vacuum line (22).

The reflux vessel (29) acts as a fractionation chamber for the liquid stream. In the fractionation chamber the liquid stream is separated into an organic liquid phase comprising the aromatic alkylene monomer and a further liquid phase which comprises the water, and which is immiscible with the organic liquid phase. It is thus possible to separate from the liquid stream the stripping agent (water). The water is removed from the reflux vessel (29) as an eighth stream, via a withdrawal pipe (32), and passed to a stripping column (S1).

In S1 the eighth stream is subjected to azeotropic stripping under vaccum using steam provided through line (44). An overheads stream comprising steam and the majority of the aromatic alkylene monomer is removed via line (41), and condensed either in a separate condenser (not shown) or in condenser (12) and fed to the reflux vessel (29).

The bottoms stream comprising water and a reduced quantity of aromatic alkylene monomer is removed from the stripping column (S1) via line (42).

A portion of this stream is recycled as the stripping agent via line (35). The remainder is passed to disposal via line (43).

In a further embodiment, other process water streams from the overall process may also be passed via line (40) to the stripping column (S1) for treatment.

The ninth stream comprising aromatic alkylene monomer is removed from the reflux vessel (29) via line (13), cooled, or even supercooled, and passed to Z1, preferably to the top part (or the top half) of Z1, especially to the top of Z1.

A portion of the liquid stream in line (13) may be advantageously taken into the recovery line (13) and recycled to Z2 instead of Z1 by means of a withdrawal line (33) which links the recovery line (13) to Z2, preferably to the top part (or the top half) of Z2, especially to the top of Z2. This makes it possible especially to intensify the liquid/gas contact in Z2 and to improve the extraction of the heaviest compounds, especially of the oligomers in Z2.

Other components known to the person skilled in the art, but not shown in FIG. 1, may also be present, in particular at least one preheater equipped with static blending means arranged on the line (2) and/or the line (3) before the first devolatilizer DV1 and/or the second devolatilizer DV2, so as to bring the mass of polymer melt to the desired devolatilization temperature, as described above.

The example which follows illustrates the present invention.

EXAMPLE

A polystyrene having a high impact strength ("HIPS") and modified by grafting onto a polybutadiene is continuously manufactured as represented diagrammatically in FIG. 1, in a bulk polymerization zone (1), so as to form a mass of polymer melt which is conveyed via a line (2) into a first devolatilizer DV1. The mass of polymer melt is preheated to 169° C. by passing through a preheater (not shown in FIG. 1) equipped with static blending means and arranged on the line (2). The amounts expressed in the form of "parts" hereinbelow in the present example are "parts by weight". The mass of polymer melt thus preheated contains, per 100 parts of polymer (comprising 90.6 parts of polystyrene and 9.4 parts of polybutadiene), 22.7 parts of styrene, 0.89 part of styrene oligomers and 11.61 parts of hydrocarbon-based styrene impurities (consisting essentially of a mixture of EB, cumene, NPB, MCH and ET). The mass of polymer melt is introduced, at a flow rate of 16 222 kg/h, into DV1 heated to 235° C. and under an absolute pressure of 4 kPa.

A gaseous first stream separated from the polymer is conveyed via a withdrawal line (4) into a first direct condensation and fractionation zone Z1: it contains, per 100 parts of styrene, 2.65 parts of styrene oligomers and 51.44 parts of hydrocarbon-based styrene impurities. The gaseous first stream is introduced into the bottom of Z1, at a flow rate of 4 169 kg/h. The zone Z1 comprises a bottom part (25) for "direct condensation" (and especially for "saturation") and a top part (24) for "fractionation" or "extraction" of the oligomers, the height of which is equivalent to 4 theoretical plates. The zone Z1 contains internal packing known under the trade reference "Mellapak"® and sold by Sulzer Chemtech (Switzerland). The zone Z1 contains no boiling vessel. The absolute pressure in Z1 is 4 kPa. The temperature at the bottom of Z1 is 65° C., and that at the top of Z1 is 41° C. From the bottom of Z1 leaves, via a bottom withdrawal line (6), a liquid stream L1 comprising 62 parts of styrene oligomers, 25 parts of styrene and 13 parts of hydrocarbon-based styrene impurities, at a flow rate of 63 116 kg/h. A portion of the liquid stream L1 is taken from the line (6) via a recycling line (8) equipped with a cooling unit (9) which cools the liquid stream L1 to 56° C. The portion of the liquid stream L1 thus cooled is then conveyed into the central part of Z1, at a flow rate of 63 000 kg/h. At the top of Z1, a gas stream leaves via a top withdrawal line (5), and is then condensed in a condenser (16) to form a styrene-rich liquid stream, comprising, per 100 parts of styrene, 0.009 part of styrene oligomers and 51.15 parts by weight of hydrocarbon-based styrene impurities, at a flow rate of 4 176 kg/h. This styrene-rich liquid stream is conveyed via a recovery line (17) into a reflux vessel (18) and is then recovered via a pump (19) and conveyed into the polymerization zone (1) and/or into a styrene manufacturing unit (20). A portion of the styrene-rich liquid stream is taken from the recovery line (17) and is then returned via a reflux line (21) into the top of Z1, at a flow rate of 60 kg/h. From the reflux vessel (18) leaves a vacuum line (22) towards a vacuum unit (not shown in FIG. 1) which allows the desired pressure in Z1 and in DV1 to be maintained and regulated.

The mass of polymer melt is removed from DV1 via a line (3) as the second stream at a flow rate of 12 053 kg/h: it contains, per 100 parts of polymer, 0.16 part of styrene, 0.28 part of styrene oligomers and 0.08 part of hydrocarbon-based styrene impurities. Water superheated to 190° C. is added via a line (35) to the mass of polymer melt circulating in the line (3), at a rate of 2.10 parts by weight per 100 parts by weight of polymer. The resulting mixture passes through a static mixer (36) to produce a third stream which is passed into a second devolatilizer, DV2, heated to 230° C. and under an absolute pressure of 4 kPa. A gaseous fourth stream separated from the polymer in DV2 is conveyed via a withdrawal line (10) into a second direct condensation and fractionation zone Z2, at a flow rate of 271.6 kg/h: it contains, per 100 parts of styrene, 1389 parts of water, 20.01 parts of styrene oligomers and 51 parts of hydrocarbon-based styrene impurities. The mass of polymer melt which leaves as the fifth stream from the bottom of DV2 via a line (34) at a flow rate of 12 500 kg/h contains, per 100 parts of polymer, less than 0.01 part of styrene, less than 0.01 part of hydrocarbon-based styrene impurities and 0.25 part of styrene oligomers. It is conveyed via line (34) to an extruder or a pelletizer (not shown in FIG. 1) to form polymer pellets.

The gaseous fourth stream separated from the polymer in DV2 feeds, via the line (10), the bottom of Z2. The zone Z2 comprises a bottom part (28) for "direct condensation" (and especially "saturation") and a top part (27) for "fractionation" or "extraction" of the oligomers, the height of which is equivalent to 4 theoretical plates. The zone Z2 contains an internal packing known under the trade reference "Mclla-pak"® and sold by Sulzer Chemtech (Switzerland). The zone Z2 contains no boiling vessel. The absolute pressure in Z2 is 4 kPa. The temperature at the bottom of Z2 is 122° C., and that at the top of Z2 is 25° C. From the bottom of Z2 leaves, via a bottom withdrawal line (14), the seventh stream, which is an oligomer-rich liquid stream, comprising 99.7 parts of styrene oligomers, 0.1 part of styrene and 0.05 part of hydrocarbon-based styrene impurities. The other portion of the liquid stream L1 feeds, via the line (6), the central part of Z2, at a flow rate of 116 kg/h. From the top of Z2 leaves, via a top withdrawal line (11), a gaseous sixth stream which essentially comprises water and styrene and which is condensed in a condenser (12) to form a liquid stream which is then conveyed via a recovery line (13) into a reflux vessel (29).

A vacuum line (31) leaves the reflux vessel (29) and joins the line (22) linked to the vacuum unit mentioned above, so as to maintain and regulate the desired pressure in Z2 and in DV2. In the reflux vessel (29) an aqueous phase is separated from the liquid stream L2 and leaves from the bottom of the vessel as an eighth stream via a line (32).

The organic phase of the liquid stream lying above the aqueous phase is recovered at a temperature of 25° C. outside the vessel (29) as a ninth stream via a recovery line (13) and via a pump (30). The ninth stream is then conveyed into the top of Z1 via the line (13) at a flow rate of 63 kg/h. A portion of the ninth stream is taken from the line (13) via a withdrawal line (33) and is then returned into the top of Z2 at a flow rate of 180 kg/h.

The eighth stream containing 250 ppm of dissolved styrene is passed at 13° C. via line (32) at a flow rate of 333 kg/h to a is sent to a 200 mm diameter stripping column containing a corrugated structured packing (1 transfer unit) and operating at a pressure of 20 mbars absolute. Also passed to the stripping column via line (40) is a process water stream containing water and 340 ppm of dissolved styrene at 30° C. at a flow rate of 417 kg/h (from a vacuum jet unit), and via line (44) 15 kg/h of very low pressure (LLP) steam at 120° C. A bottoms stream containing water and 10 ppm of dissolved styrene at 18° C. is removed via line (42), and 317 kg/h of this is recycled as stripping agent while the surplus (427 kg/h) is sent to waste treatment plant. The overhead stream containing steam and most of the organic components of the feed is removed via line (41), condensed and sent to the reflux drum (29) where further separation occurs.

The amount of water sent to waste treatment is significantly reduced, and the content of styrene therein is reduced from an average of 300 ppm (based on combined streams (32) and (40)) to 10 ppm. The recovered styrene is recycled to reflux drum (29) and subsequently, via line (13), can be recovered for further use.

The invention claimed is:

1. A process for devolatilization of an aromatic alkylene polymer, which comprises:
    a) providing the aromatic alkylene polymer product in the form of a mass of polymer melt also comprising aromatic alkylene monomer and oligomers,
    b) subjecting the mass of polymer melt to a first devolatilization step to produce a gaseous first stream comprising aromatic alkylene monomer and oligomers, and a second stream comprising the remainder of the mass of polymer melt,
    c) adding water as a stripping agent to the second stream to produce a third stream comprising the remainder of the mass of polymer melt and the water,
    d) subjecting the third stream to a second devolatilization step to produce a gaseous fourth stream comprising the water, aromatic alkylene monomer and oligomers, and a fifth stream comprising the devolatilized mass of polymer melt,
    e) subjecting the gaseous fourth stream to a separations step to produce a sixth stream comprising the water and aromatic alkylene monomer and a seventh stream comprising the oligomers,
    f) subjecting the sixth stream to a separations step to separate an eighth stream comprising the water and a reduced quantities of aromatic alkylene monomer from a ninth stream comprising the remainder of the aromatic alkylene monomer,
    g) subjecting the eighth stream to azeotropic stripping in a stripping column under vacuum using steam to produce an overheads stream comprising steam and the majority of the aromatic alkylene monomer which is passed with the sixth stream to the separations step (f), and a bottoms stream comprising water with a reduced quantity of aromatic alkylene monomer, at least a portion of which is recycled as the stripping agent in step (c).

2. A process as claimed in claim 1, wherein step (a) comprises bulk polymerising an aromatic alkylene monomer at a temperature ranging from 100° C. to 200° C. and at an absolute pressure ranging from 0.1 to 10 MPa to produce a mass of polymer melt comprising aromatic alkylene monomer and oligomers.

3. A process as claimed in claim 1, wherein the gaseous first stream comprising aromatic alkylene monomer and oligomers removed from step (b) is passed to a separations step which is a first zone for direct condensation or fractionation (Z1), from which a gas stream comprising essentially the monomer is removed from the top and recycled into a reaction for the polymerization of the aromatic alkylene, and/or conveyed into an aromatic alkylene manufacturing unit, while a liquid stream (L1) rich in oligomers is removed from the bottom.

4. A process as claimed in claim 1, wherein in step (c) the water is added in an amount ranging from 0.5% to 5% by weight relative to the polymer and mixed in a static mixer to produce the third stream.

5. A process as claimed in claim 1, wherein the separations step of step (e) is a second zone for direct condensation or fractionation.

6. A process as claimed in claim 1, wherein the separations step of step (f) is a fractionating step which fractionates by phase separation and/or by decantation an organic liquid phase comprising the aromatic alkylene monomer (ninth stream) from a liquid phase which comprises the water (eighth stream), and which is immiscible with the organic liquid phase (ninth stream).

7. A process as claimed in claim 1, wherein step (g) comprises direct stream injection into the stripping column and wherein the stripping column is operated at a reboiling ratio of 1-3%.

* * * * *